United States Patent [19]

Shirley

[11] Patent Number: 5,309,663
[45] Date of Patent: May 10, 1994

[54] LINEAR FISH CATCHING DEVICE

[76] Inventor: Edward S. Shirley, P.O. Box 181, Queen City, Tex. 75572-0181

[21] Appl. No.: 51,891

[22] Filed: Apr. 26, 1993

[51] Int. Cl.⁵ .................................... A01K 97/00
[52] U.S. Cl. ................................................ 43/15
[58] Field of Search ............ 43/15, 42.7, 42.72, 43/44.95

[56] References Cited

U.S. PATENT DOCUMENTS

| | | | |
|---|---|---|---|
| 2,085,320 | 6/1937 | Kolstrand | 43/42.72 |
| 2,694,875 | 11/1954 | Hoffmann | 43/15 |
| 3,660,922 | 5/1972 | Chill | 43/15 |
| 3,766,679 | 10/1973 | Noe | 43/15 |
| 3,823,501 | 7/1974 | Bybee | 43/15 |
| 4,124,948 | 11/1978 | Mautner | 43/15 |
| 4,547,990 | 10/1985 | Hero | 43/15 |
| 4,924,617 | 5/1990 | Parent | 43/15 |

OTHER PUBLICATIONS

Popular Mechanics, "Bobber Sets Hook When Fish Nibbles", Jul. 1953, p. 125.

*Primary Examiner*—Paula A. Bradley
*Assistant Examiner*—Jeanne M. Elpel
*Attorney, Agent, or Firm*—Stephen D. Carver

[57] ABSTRACT

A linear fish catching device having an elongated barrel and a coaxially disposed internal elastic spring humanely allows hooked fish to remain in the water until harvesting. Preferably the elastic tube spring extends between a pair of spaced apart guiding elements coaxially centered within the device. The device is cocked by stretching the spring tube, that functions as a linear spring. The line from the open end of the barrel is secured when a captivated stop registers with a slot defined in the barrel end. When a fish strikes, line is dislodged from the slot, freeing the stop which is thereafter drawn into the tubular barrel by contraction of the elastic spring. Alternative couplings for centering spring movement are disclosed. Each coupling comprises a cylindrical body having a penetrable eyelet and a pair of aligned relief slots that provide clearance when line is tied to the eyelet.

13 Claims, 2 Drawing Sheets

U.S. Patent            May 10, 1994            Sheet 1 of 2            5,309,663
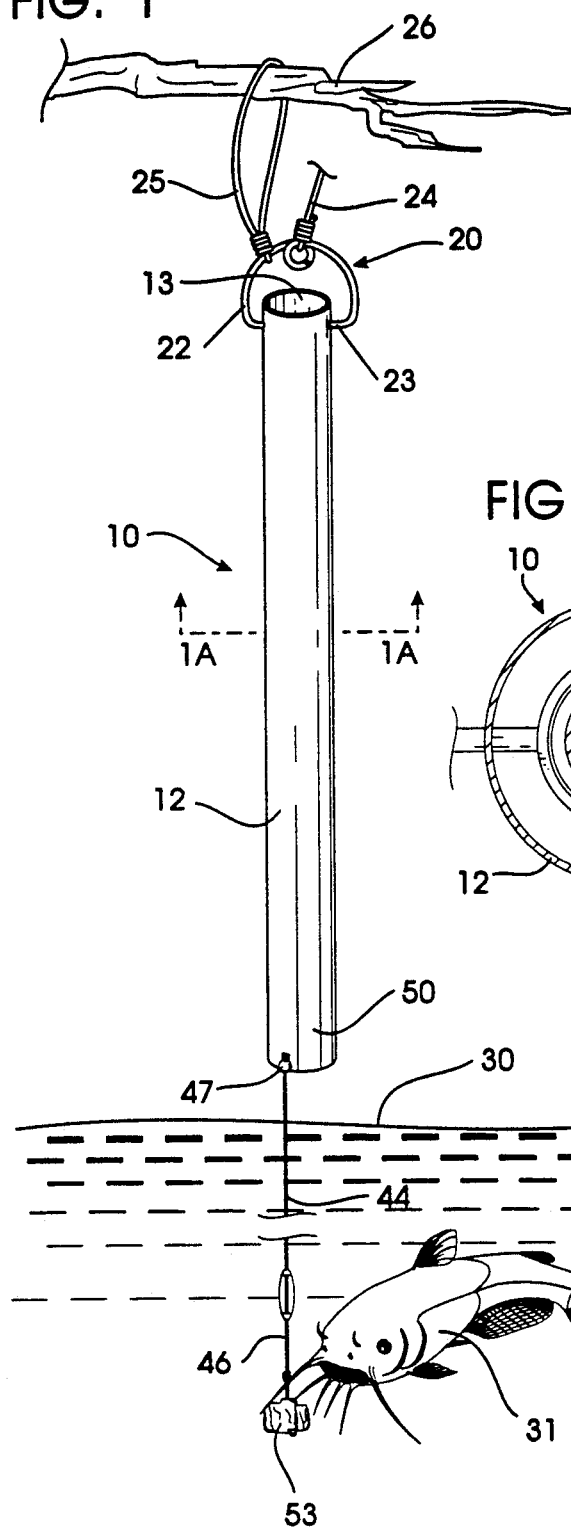
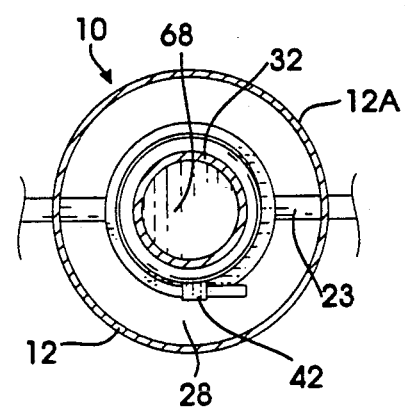
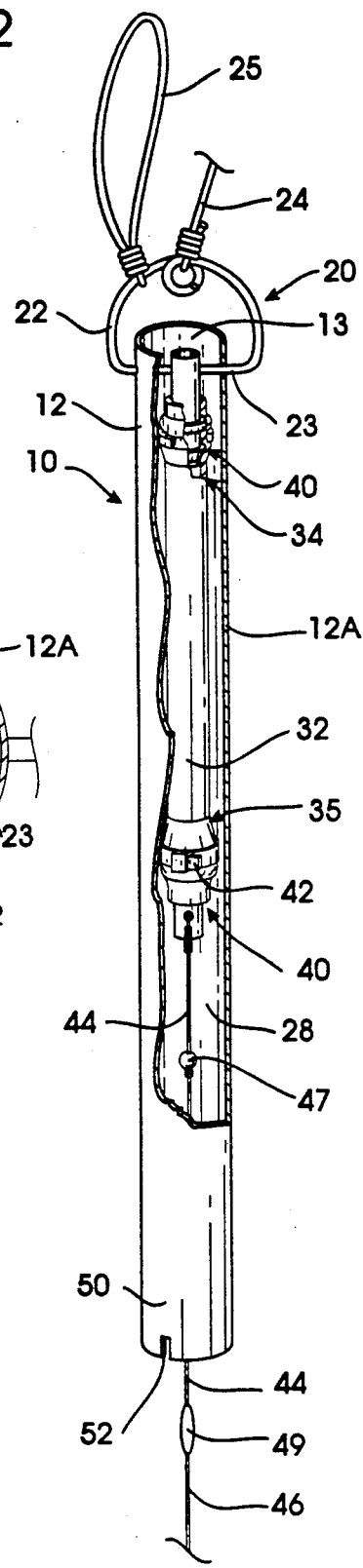

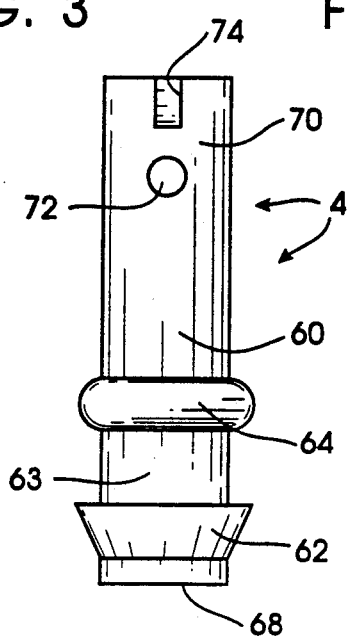
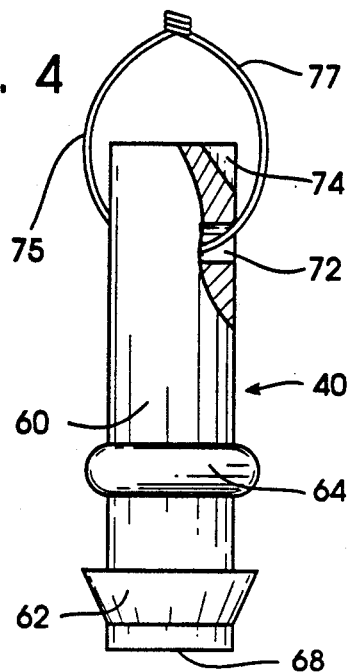
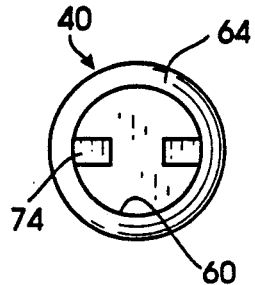
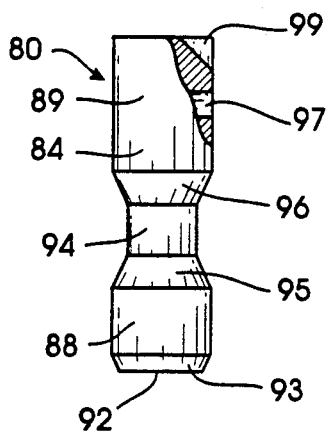
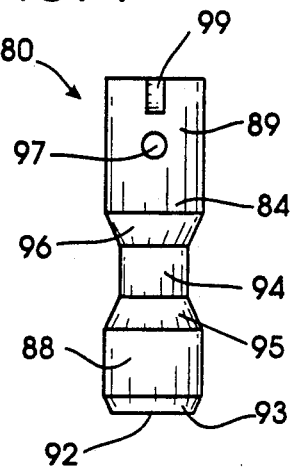
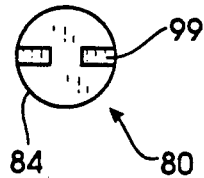
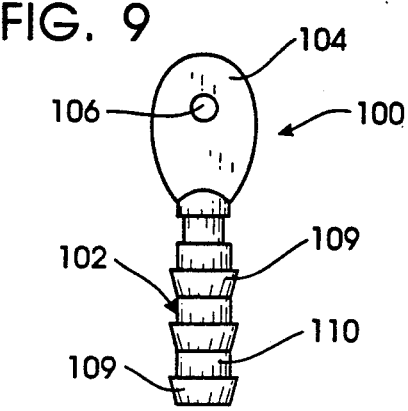
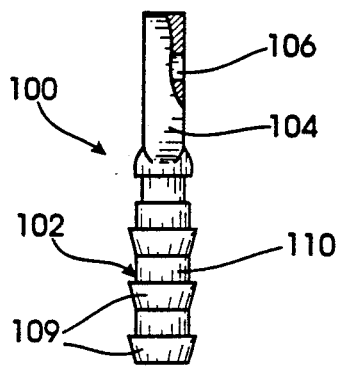

LINEAR FISH CATCHING DEVICE

BACKGROUND OF THE INVENTION

My invention relates generally to automatic fish catching, hooking and retrieval devices. More particularly, my invention relates to automatic hooking devices that humanely catch fish.

In the prior art a variety of fish catching devices are well known. Especially in the American south, rotary fish catching devices known as "Yo-Yo's" have been used for several years. Yo-Yo's generally comprise a metallic, casing in which a spring activated spool contains line to be unwound. The line may terminate in a baited hook, and when a fish strikes, the spring within the Yo-Yo tightens the line to hook the fish. Conventional round, metallic fishing Yo-Yo's have a number of disadvantages well known to fishermen.

Prior art rotary Yo-Yo's can rust and deform. They are difficult to employ because of their internal spring, and once subjected to water, dirt and the elements, Yo-Yo's tend to corrode and jam over time. On the other hand, their metallic construction and relatively precise tolerances means that the cost of production is relatively high. While I am personally familiar with conventional Yo-Yo's, I feel that a much better approach needs to be developed.

Prior art Yo-Yo's tend to drag the hooked fish out of the water, resulting in a slow death. Many states have outlawed conventional Yo-Yo's because of this reason. To be humane and effective, a fish hooking and retrieval device must allow the captured fish to remain in the water until harvested.

Others have suggested fish retrieving and catching devices previously. U.S. Pat. No. 4,121,367, issued to Lopez on Oct. 24, 1978 discloses art that is relevant to my invention. This fishing rod encloses a coaxially centered elastic line that, when triggered, can hook a fish. However, numerous differences exist, most importantly in the matter or mode in which the elastic trigger is deployed.

U.S. Pat. No. 4,924,617, issued May 15, 1990 to Parent discloses a hook setting device having a frame in which a lever is sprung for actuation. A line extends from a ball locked within a trigger seat, and when a fish bites the device triggers.

Adams U.S. Pat. No. 3,605,315 issued Sep. 20, 1971 discloses a relatively complex metallic line tensioner that is triggered when the fish initially bites. Some variations of this theme involve a holder wherein a conventional fishing rod is simply held in a mechanical device. An example of this is seen in U.S. Pat. No. 4,213,264 issued Jul. 22, 1980.

Other examples of fish catching devices are seen in U.S. Pat. Nos. 4,471,553, 4,944,106, and 3,766,680.

However, no prior art retrieval device of which I am aware discloses a self contained, virtually fool-proof elasticized trigger system that can be readily employed from either a boat, tree or similar support or stationary object, or embodied within a flotation device. More particularly, known prior art devices do not precisely control or center the spring properly, so as to continually present a coaxial pathway when the spring retracts. Stated another way, I have cured the known problems in the prior art by combining an elastic spring centered within a coaxial tube that protects the mechanism, while accomplishing fastening through unique couplings that function as guides to prevent jamming of the apparatus. Moreover, I have proposed a fish hooking mechanism that allows the fish to remain in the water.

SUMMARY OF THE INVENTION

I have provided a linear fishing device in which an elongated barrel thoroughly encapsulates and shrouds an internal elastic spring. Preferably the spring comprises an elastic tube that is fitted between a pair of guiding elements coaxially centered within the device.

The device is set by stretching the tube, that functions as a linear spring. The leader or line emanating from one end of the tube is secured when a stop is placed opposite a slot in the barrel so that the line cannot be retracted. Once a fish bites, the line or leader is dislodged from the slot, freeing the stop that is thereafter drawn into the tubular barrel by action of the elastic spring.

Preferably the spring is a rubber tube terminated at each end to identical plastic couplings. The fittings include a body member adapted to coaxially penetrate the tube, and a tab end that is swiveled at one end and anchored inside of the barrel. The other end is attached to a fishing leader or a line. The line is thus pivotally interconnected with the spring, and the spring itself is coaxially pivoted interiorly of the barrel. The fittings help maintain the spring tube coaxially centered within the barrel, to prevent jamming.

Because of the inherent coaxial alignment of the various fittings as they are connected to the spring tube, I have provided an inherently reliable, jam proof linear fish catching device that does not corrode, that is highly reliable, and that is easily triggered when the fish strikes.

Thus an object of my invention is to provide a noncorrosive, relatively inexpensive fish catcher that can be used by fishermen for catching fish.

An important object is to provide a humane automatic fish catching device.

A fundamental object is to provide a reliable fish catching device that allows the hooked fish to stay in the water.

A related object is to provide a linear fish catcher of the character described that can easily substitute for the well known rotary Yo-Yo's in common use in the American South.

A still further object of the present invention is to provide a jam-proof, linear fish catching device in which internal elements are prevented from binding or jamming within the apparatus.

Another object of the present invention is to provide a reliable and inexpensive fish hooking device of the character described that can be used in a wide variety of real-world outdoor situations.

A still further object is to provide a device of the character described that is inherently resistant to corrosion, that is ozone resistant, and in which dirt and debris do not accumulate through normal use.

Yet another object is to provide a fish catching device of the character described that can easily be set in the dark with the minimum of effort by the fisherman.

These and other objects and advantages of the present invention, along with features of novelty appurtenant thereto, will appear or become apparent in the course of the following descriptive sections.

BRIEF DESCRIPTION OF THE DRAWINGS

In the following drawings, that form a part of the specification and which are to be construed in conjunction therewith, and in which like reference numerals have been employed throughout wherever possible to indicate like parts in the various views:

FIG. 1 is a fragmentary pictorial view illustrating use of my Linear Fish Catching Device, with the device deployed for catching a fish;

FIG. 1A is an enlarged, fragmentary sectional view of the best mode taken generally along line 1A—1A of FIG. 1;

FIG. 2 is an enlarged fragmentary view thereof, illustrating the device as it appears after a fish has been hooked;

FIG. 3 is a greatly enlarged, front elevational view of the presently preferred coupling;

FIG. 4 is a fragmentary side elevational view of the coupling of FIG. 3;

FIG. 5 is a top plan view of the coupling of FIGS. 3 and 4;

FIG. 6 is a greatly enlarged fragmentary front elevational view of an alternative coupling;

FIG. 7 is a side elevational view of the alternative coupling of FIG. 6;

FIG. 8 is a top plan view of the coupling of FIGS. 6 and 7;

FIG. 9 is a greatly enlarged front plan view of a second alternative coupling; and, FIG. 10 is a fragmentary side elevational view of the coupling of FIG. 9.

DETAILED DESCRIPTION OF THE DRAWINGS

With initial reference now directed to FIGS. 1-2 and 1A of the appended drawings, my Linear Fish Catching Device has been generally designated by the reference numeral 10. Device 10 preferably comprises a tubular elongated barrel 12 made of plastic tube or the like. The barrel 12 includes an upper end 13 that is preferably penetrated by a swivel D-ring 20. D-ring 20 comprises a loop portion 22 and an integral transverse portion 23 that penetrates barrel 12. A string 24 or loop 25 may attach the device 10 to a convenient support, such as branch 26. Once mounted above water 30, line will be deployed as described hereinafter to catch fish 31.

Barrel 12 preferably comprises a generally annular interior 28 defined between its outer body 12A and an elongated elastic spring, generally designated by the reference numeral 32. Spring 32 is formed of medical grade rubber, synthetic rubber or the like. The spring terminates in a pair of spaced apart ends 34, 35, that are stretched over an internal coupling 40. Various alternative couplings have been illustrated in FIGS. 3-10.

The tube is 32 stretched over the main body portion of each coupling and fastened with a suitable clamp 42. Thus a first coupling is in the top of the apparatus connecting the top of the tube, and a second coupling is employed at the bottom for attachment to the leader 44. The top coupling is swiveled within the barrel by transverse portion 23 of D-ring 20, that penetrates an eyelet formed therein. The bottom coupling includes a similar eyelet to which the line or leader is attached.

The leader 44 is conventional, and may be made of metal, heavy plastic line or the like. The leader 44 may include a standard clasp 49 for attachment of a separate fish line 46. Alternatively the fishing line 46 can be coupled directly to the coupling 40 within the barrel 12. A stop 47 is secured to the leader 44 or line 46. As the elastic tube 32 is extended, stop 47 will travel out of the barrel bottom 50. To cock the apparatus a portion of the line or leader is placed in slot bottom 52 defined in end 50. By then releasing the line, the elastic tube 32 will draw the line back into the barrel riding over slot 52 until stop 47 engages slot 52.

As soon as a fish strikes, moderate pressure on the line and the leader will extend the elastic tube 32, withdrawing the stop 47 adjacent slot 52 and triggering the apparatus. At this time the tube 32 contracts, at least partially drawing the fish line and the hook or bait 53 borne thereby inwardly of the barrel. While the fish is hooked in the process, it is not drawn out of the water. Of course, gentle yieldable pressure is maintained upon the fish so that the line will not be broken and the angler may return to unhook and harvest the fish. At all times as the tube 32 stetches or contracts movement within the barrel will be centered within annular space 28 inside the barrel.

FIGS. 3-5 illustrate a preferred coupling 40. Coupling 40 comprises a generally elongated and tubular plastic shank 60 of a generally uniform diameter. Shank 60 comprises a barbed ring portion 62 having an outer diameter greater than the diameter of its body, and a spaced apart second ring portion 64. A portion of the shank designated by the reference numeral 63 is disposed between rings 62 and 64. Ring 62 provides a "one way" action when the end of the elastic tube is drawn over it. Hence when the elastic is drawn over end 68 of fitting 40, it will tend to stay in place, finding it difficult to frictionally withdraw from beveled ring 62. Thereafter it is preferred that a clamp 42 be affixed in region 63, to firmly maintain the tube in place.

Shank 60 includes an upper portion 70 having a penetrable eyelet 72 and a pair of aligned slots 74. The eyelet 72 of that coupling deployed at the top of the barrel is penetrated by the D-ring 22. It thus swivel mounts the elastic tube within the barrel. The eyelet of the coupling mounting the line or leader is penetrated by the line or leader. As best viewed in FIG. 4, folded portions 75 and 77 of the leader may gently clear the end to prevent interference within the annular slot inside the device by fitting into clearance slots 74.

In FIGS. 6-8 alternative coupling 80 comprises an elongated, generally cylindrical body 84 having a terminal portion 88 and an orificed portion 89. The lowermost end 92 is beveled at 93. The body shank includes a reduced diameter portion 94 separated by twin beveled portions 95, 96. A portion of the elastic tube may be drawn over portion 88, and stretched between the beveled portions 95 and 96 for clamping about reduced diameter portion 94.

The upper portion 84 of alternative coupling 80 includes a suitable orifice 97 that extends all the way through for tying to a leader or line as before. Again a relief slot 99 is provided on each side of the body for receiving portions of the leader or line and getting them out of the way to prevent frictional binding within the barrel.

Alternative coupling 100 (FIGS. 9-10) includes a shank portion 102 integral with a tab portion 104. The upper tab portion 104 includes an orifice 106 adapted to be penetrated by the line or the mounting within the apparatus. For example, tab 104 may be secured in the upper confines of the apparatus and penetrated by D-ring portion 23 as illustrated in FIGS. 1 and 2. The shank 102 includes a plurality of integral, spaced apart barbs 109 similar to ring 62 in FIG. 3. They are separated from one another by reduced diameter shank portions 110 and provide a barbed like effect to firmly grasp the elastic tube when it is stretched over the shank 102.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A linear fishing device comprising:
    an elongated, generally tubular barrel adapted to be secured to a stationary support;
    an elongated spring generally coaxially disposed within said barrel, said spring comprising an elongated, elastic tube having first and second spaced apart terminal ends;
    a first coupling pivotally connecting said first end of said tube within said barrel;
    a second coupling connected to said second end of said tube;
    said first and second couplings each comprising an elongated body comprising a swivel end having a penetrable orifice and a tube receptive end secured to said elastic tube;
    a leader adapted to be selectively coupled to a baited fish line, or lure said leader pivotally connected to said second coupling; and,
    means for temporarily cocking said device until a fish bites.

2. The device as defined in claim 1 wherein said cocking means comprises a slot defined in said barrel and a stop fixed to said leader for engaging said slot until a fish strikes.

3. The device as defined in claim 1 wherein each of said couplings comprises a first ring portion for engaging said elastic tube, a second ring portion, and a clamp portion disposed between said ring portions.

4. The device as defined in claim 3 wherein said first and second ring portions have a diameter greater than the diameter of said coupling body.

5. The device as defined in claim 1 wherein each of said couplings comprise first and second reduced diameter beveled portions, and a clamp is disposed between said first and second beveled portions.

6. The device as defined in claim 1 wherein each of said couplings comprises a plurality of spaced apart, barbed rings for engaging said elastic tube.

7. The device as defined in claim 6 wherein said couplings comprise a tab integral with said body, the tab having a mounting orifice defined therein.

8. An automatic fishing device for hooking a fish, said device comprising:
    an elongated, generally tubular barrel adapted to be secured to a stationary support;
    an elongated elastic tube generally coaxially disposed within said barrel, said tube having a pair of spaced apart terminal ends;
    a first coupling securing a said first end of said tube within said barrel;
    a second coupling secured to a second end of said tube;
    a fish line connected to said second coupling; and,
    means for temporarily cocking said device until a fish bites, said cocking means comprising a line-receptive slot defined in said barrel and a stop on said line for engaging said slot until a fish strikes; and,
    said first and second couplings each comprising an elongated body comprising a swivel end having a penetrable orifice and a tube receptive end secured to ends of said elastic tube.

9. The device as defined in claim 8 wherein each of said couplings comprises a first ring portion for engaging said elastic tube, a second ring portion, and a clamp portion disposed between said ring portions.

10. The device as defined in claim 8 wherein each of said couplings comprise a first and second reduced diameter beveled portion, and a clamp disposed between said first and second beveled portions.

11. The device as defined in claim 8 wherein each of said couplings comprise a plurality of spaced apart, barbed rings for engaging said elastic tube.

12. The device as defined in claim 11 wherein said couplings comprise a tab integral with said body with a mounting orifice defined therein.

13. A fishing device for automatically hooking a fish, said device comprising:
    an elongated, generally tubular barrel having a top and a bottom;
    an elongated elastic tube generally coaxially disposed within said barrel that can be stretched to cock said device, said tube having a first end secured within said barrel and a second end;
    a first coupling comprising a swivel end having a penetrable orifice secured within said barrel at the top thereof and a tube receptive end secured to said first end of said elastic tube;
    a second coupling comprising a swivel end having a penetrable orifice and a tube receptive end secured to said second end of said elastic tube;
    a fish leader connected to said second coupling swivel end for connection to a fish line;
    slot means defined in said barrel for temporarily receiving at least a portion of said leader when said device is cocked; and,
    a stop secured to said leader for yieldably locking against said slot until a fish strikes, whereupon said leader escapes said slot and said tube contracts to hook said fish.

* * * * *